Oct. 15, 1957  J. GILLESPIE ET AL  2,809,659
VALVE COMBINATION
Filed April 14, 1954
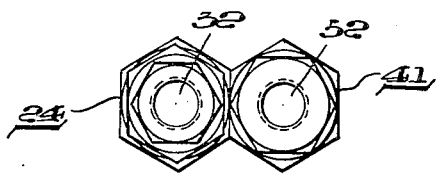
Fig. 2.
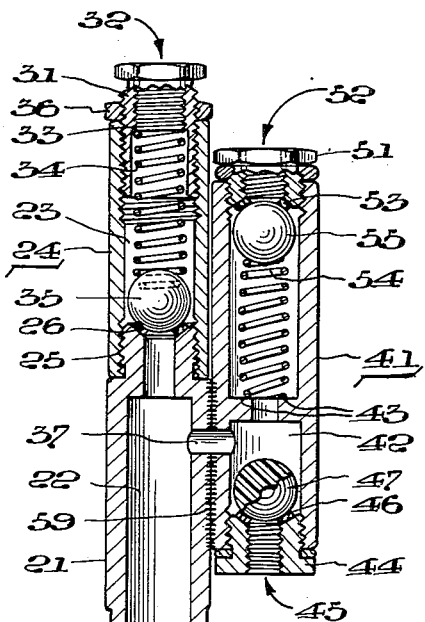
Fig. 1.
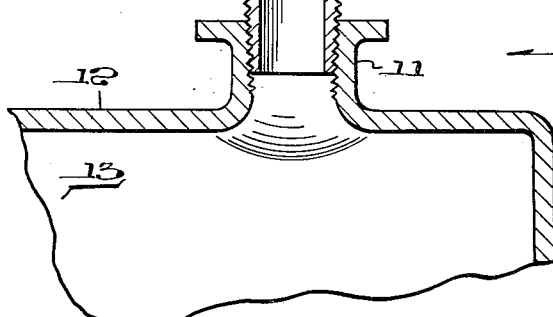
INVENTORS.
JOSEPH GILLESPIE,
ALLEN T. CORDILL.
BY
Their ATTORNEY.

United States Patent Office 2,809,659
Patented Oct. 15, 1957

2,809,659

VALVE COMBINATION

Joseph Gillespie and Allen T. Cordill, Indianapolis, Ind.

Application April 14, 1954, Serial No. 423,152

3 Claims. (Cl. 137—512)

This application is concerned with a combination comprising a plurality of direct response valves. In general it is concerned with a combination of valves comprising a pressure relief valve, a vacuum relief valve and a valve for the introduction of fluid to a system to which the valve combination is attached. In an important aspect the invention is concerned with a combination of valves incorporated within a stainless steel, bifurcated valve body in which the pressure relief valve and the valves for the introduction of fluid into the system are stainless steel ball check valves and the vacuum relief valve is a synthetic resin ball check valve.

The valve combination of this invention is adapted to be connected to a system for the storage or dispensing of fluids, particularly liquids. It provides such a system with protection against excess pressures, against vacuum within said system and provides a means of introducing a fluid, such as air, into the system under a pressure less than that at which the pressure relief valve operates. For example the invention finds utility in combination with a tank for the storage or dispensing of liquid fertilizer solutions which are of a corrosive nature, as are the vapors generated by such solutions. The valve combination of this invention provides a non-corrosive, economical means for effecting a controlled pressure within a closed tank containing liquid fertilizer solutions, providing at the same time protection against vacuum and excess pressure. For example, tanks constructed to withstand approximately 20 p. s. i. pressure and constructed of, or coated with, a non-corrosive material can be used in combination with this invention for the storage of liquid fertilizer solutions. Further a tank so equipped can be used to distribute the liquid fertilizer under pressure, by introducing, for example, air through the valve combination of this invention at a pressure less than the pressure at which the pressure relief valve is set. Additionally the liquid fertilizer solution can be distributed by gravity, in which operation the vacuum relief valve allows air to enter the tank and prevent reduced pressures therein.

The invention comprises, in a bifurcated valve body adapted to be connected to a fluid containing system, the combination of a direct response pressure relief valve positioned in one branch of said body and, oppositely positioned in the other branch of said body, a gravity seated vacuum relief valve and a check valve adapted to permit flow of fluid into said system and to be seated by the pressure within said system.

In the preferred embodiment of the invention the pressure relief valve is positioned directly above the opening connecting the valve body to the fluid containing system. The other valves are positioned in the other branch of said bifurcated valve body. It will be seen that this arrangement minimizes any danger of clogging and thus insures proper operation of the pressure relief valve.

Referring to the drawings, Figure 1 is a vertical cross-sectional view of a preferred embodiment of this invention.

Figure 2 is a plan view.

Referring to the drawings, the threaded connection means 11 is attached to the walls 12 of the fluid containing system 13 (shown only in broken section). To the threaded connection 11 is attached the threaded base portion 21 of the bifurcated valve body which portion conveniently is constructed from a hexagonal stainless steel bar. Within the base portion 21 is the passage 22 which communicates with the chamber 23 of the branch 24 of the bifurcated valve body. Branch 24, conveniently constructed of tubular stainless steel, is connected by threads 25 to the base portion 21. The upper extremity of base 21 teminates in a frusto-concal shape containing the rubber valve seat 26. The upper portion of branch 24 is threaded internally to receive the cap 31 which has an opening 32 communicating to the atmosphere. Further this cap has a shoulder 33 engaging the spring 34 which forces the ball 35 into engagement with the seat 26. The cap 31 is externally threaded and is equipped with the locknut 36.

The passage 22 in base 21 is connected by passage 37 with the other branch 41 of the bifurcated valve body. This branch has a passage 42 completely therethrough, and the shoulders 43 therewithin. At its lower extremity the branch is threaded internally to receive the cap 44 which has the opening 45 communicating to the atmosphere. The upper portion of the cap 44 is of a frusto-conical shape and contains the rubber seat 46, on which rests the nylon sphere 47.

At its upper extremity the branch 41 is threaded internally to receive the cap 51 which has an opening 52 communicating to the atmosphere. This cap terminates at its lower extremity in a frusto-conical shape and contains the rubber seat 53 and is internally threaded at its upper extremity to receive an air pressure supply line. The shoulders 43 support the spring 54 which forces the stainless steel sphere 55 against the seat 53. The branch 41 conveniently is constructed of hexagonal stainless steel and is connected by the weld 59 to the base portion 21.

Preferably the valve body components are fabricated of stainless steel, particularly if they are to be used in a corrosive atmosphere, such as, for example, with a system containing a liquid fertilizer.

It will be noted that the cap 31 can be adjusted vertically with respect to the branch 24 which in turn adjusts the pressure on the spring 34 and thus regulates the pressure at which the ball 35 rises from the seat 26 to relieve. The lock nut 36 keeps the cap 31 in the desired position.

In operation, as the pressure within the system 13 rises above a given pressure the ball 35 rises and system vents through passages 22, 23 and 32. If a vacuum occurs within the system the ball 47 rises to allow air to enter through passage 45 and the pressure within the system to be equalized with the atmospheric pressure. In the event it is desired to operate the system 13 under a pressure below that for which the pressure relief valve is set to operate, a source of fluid pressure, for example, air pressure is connected to the internal threads of cap 51. As this pressure is greater than that within the system and sufficient to overcome the pressure of the spring 54 the sphere 55 separates from the seat 53 and air enters the system 13 via passages 42, 37 and 22.

It will be observed that each of the valves contributes to the overall operation of the system. For example the spheres 47 and 55 each are seated by the system pressure, yet the valve 35 operates to prevent excess pressure. Similarly, while valves 35 and 55 operate to prevent entrance of air to the system to relieve a vacuum, the valve 47 rises to allow entrance of air if a vacuum occurs within the system. Further valves 35 and 47 cooperate to prevent escape of air from the system when valve 55 is opened to allow entrance of air under pressure into the system. Thus it will be seen that the valves cooperate each with the other two to provide a combination possessing the various advantages heretofore mentioned.

Obviously many modifications and variations of the invention as hereinbefore set forth may be made without departing from the spirit and scope thereof and therefore only such limitations should be imposed as are indicated in the appended claims.

What is claimed is:

1. In a bifurcated valve body having two interconnected substantially parallel passageways the combination of connection means positioned at one end of the first of said passageways and adapted to connect said valve body to a pressure vessel, a pressure relief valve oppositely positioned with respect to said connection means in said first passageway, a gravity seated vacuum relief valve positioned in the second of said passageways and adjacent said connection means, a spring loaded valve adapted to be seated by pressure within said valve body oppositely positioned with respect to said vacuum relief valve in said second passageway, and means cooperating with said spring loaded valve for the introduction of fluid pressure into said valve body, the inter-connection between said passageways being positioned between said connection means and said pressure relief valve in said first passageway and between said vacuum relief valve and said spring loaded valve in said second passageway.

2. The valve body of claim 1 in which the valve body is of stainless steel, the direct response pressure relief valve is a spring loaded stainless steel ball check, the check valve is a spring loaded stainless steel ball check valve, the vacuum relief valve is a ball check in which the ball is of a synthetic resin, and in which said valve seats are of a resilient material.

3. The combination of claim 2 in which the synthetic resin is nylon and the resilient material is rubber.

References Cited in the file of this patent

UNITED STATES PATENTS

| | | |
|---|---|---|
| 1,006,159 | Wetherholt | Oct. 17, 1911 |
| 1,240,254 | Prescott | Sept. 18, 1917 |
| 1,573,731 | Meijer | Feb. 16, 1926 |
| 1,671,609 | Roberts | May 29, 1928 |
| 2,191,611 | Eshbaugh | Feb. 27, 1940 |
| 2,297,076 | Sacks | Sept. 29, 1942 |
| 2,424,108 | Merten | July 15, 1947 |
| 2,641,278 | Eplett | June 9, 1953 |

FOREIGN PATENTS

| | | |
|---|---|---|
| 15,000 | Great Britain | of 1890 |